United States Patent
Langeslag et al.

(10) Patent No.: US 11,444,540 B1
(45) Date of Patent: Sep. 13, 2022

(54) LOOP GAIN COMPENSATION OF INTERLEAVED BOOST CONVERTER USING CYCLE TIME

(71) Applicant: NXP USA, Inc., Austin, TX (US)

(72) Inventors: Wilhelmus Hinderikus Maria Langeslag, Wijchen (NL); Remco Twelkemeijer, Wijchen (NL)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/381,161

(22) Filed: Jul. 20, 2021

(51) Int. Cl.
| | |
|---|---|
| *H02M 3/158* | (2006.01) |
| *H02M 7/217* | (2006.01) |
| *H02M 1/42* | (2007.01) |
| *H02M 1/08* | (2006.01) |

(52) U.S. Cl.
CPC ....... *H02M 3/1586* (2021.05); *H02M 1/4225* (2013.01); *H02M 7/217* (2013.01); *H02M 1/081* (2013.01)

(58) Field of Classification Search
CPC .. H02M 1/081; H02M 1/4225; H02M 3/1586; H02M 7/217
See application file for complete search history.

(56) References Cited

U.S. PATENT DOCUMENTS

| | | | | |
|---|---|---|---|---|
| 2012/0250363 | A1* | 10/2012 | Skinner | H02M 3/1584 363/21.12 |
| 2016/0276924 | A1* | 9/2016 | Castelli | H02M 3/33515 |
| 2018/0226881 | A1* | 8/2018 | Chae | H02M 3/1582 |
| 2019/0052169 | A1* | 2/2019 | Bhandarkar | H02M 1/4225 |

OTHER PUBLICATIONS

Aditya, Kunwar et al. "Design of 3.3 kW Wireless Battery Charger for Electric Vehicle Application Considering Bifurcation", 2017 IEEE Electrical Power and Energy Conference (EPEC), (2017), 6 pgs.
Balestro, Juan Paulo Robles et al. "Power Factor Correction Boost Converter Based on the Three-State Switching Cell", IEEE Transaction on industrial Electronics, vol. 59, No. 3, Mar. 2012, pp. 1565-1577.
Cao, Guoen et al. "A Novel Critical-Conduction-Mode Bridgeless Interleaved Boost PFC Rectifier", 2014 International Power Electronics Conference, (2014), 6 pgs.
Tomioka, Satoshi et al. "Interleaved-Boost-Input Tupe Isolated Full Bridge PFC Converter", IEEE PEDS 2005, pp. 146-151.
Park, Moo-Hyun et al. "ZVS Interleaved Totem-pole Bridgeless PFC Converter with Phase-shifting Control", The 2018 International Power Electronics Conference, (2018), 5 pgs.
Chang, Chien-Hsuan et al. "An Interleaved Single-Stage LLC Resonant Converter Used for Multi-Channel LED Driving", The 2014 International Power Electronics Conference, (2014), 8 pgs.

\* cited by examiner

*Primary Examiner* — Jue Zhang

(57) ABSTRACT

A method and apparatus are described for controlling the gain of a phase loop of an interleaved boost converter using cycle signals. In an embodiment, a phase compensator compares a duration of the power phase of a converter to a cycle duration for the converter to generate a phase compensation. A phase adjustment module receives phase feedback signals of the first and second converters, measures the phase difference, receives the phase compensation, and generates a phase control output in response. A cycle controller receives the phase control output and generates first and second drive signals to control switching of first and second gates of the respective converters, wherein times of the first and second drive signals are adjusted using the phase control output.

20 Claims, 9 Drawing Sheets

LOOP GAIN COMPENSATION OF INTERLEAVED BOOST CONVERTER USING CYCLE TIME

BACKGROUND

Electric power conversion is widely used in varied applications including adjustable-speed electric motor drives, switch-mode power supplies, uninterrupted power supplies (UPSs), and battery energy storage. In high-power applications, two boost converters are often interleaved to improve the performance and reduce the size of converter. For high-current applications and voltage step-up, the currents through the solid-state switches are just fractions of the input current. Interleaving also doubles the effective switching frequency and allows the size of energy-storage inductors and EMI filter components to be reduced. This also reduces input and output ripples in the current. The switches are used to time the power phase of each converter. Typically, the two converters alternate in operation so that their power cycles are 180 degrees out of phase.

Power Factor Correction (PFC) converters are used for improved power quality and improved efficiency. Passive PFC may be performed using tuned LC filters, but these may have a limited frequency and power range. Active PFC uses actively controlled solid-state switches in association with passive elements. The switches allow the PFC converter to operate in different modes. A PFC boost converter boosts the input voltage for a higher output voltage.

SUMMARY

A method and apparatus are described for controlling the gain of a phase loop of an interleaved boost converter using cycle signals. In an embodiment, a phase compensator is configured to receive a cycle signal from a first converter of an interleaved boost converter, the cycle signal having a power phase during which power is drawn from an input of the first converter, the power phase having a primary stroke during which a first gate of the first converter is enabled and a secondary stroke during which the first gate is disabled, the phase compensator to compare a duration of the power phase to a cycle duration from the start of the primary stroke to a start of a next primary stroke and to generate a phase compensation in response thereto. A phase adjustment module is configured to receive a first phase feedback signal of the first converter and a second phase feedback signal of a second converter of the interleaved boost converter, to measure the phase difference, to receive the phase compensation and to generate a phase control output in response to the phase difference and the phase compensation. A cycle controller is configured to receive the phase control output and to generate a first drive signal to control switching of a first gate of the first converter and a second drive signal to control switching of a second gate of the second converter, wherein times of the first and second drive signals are adjusted using the phase control output.

In some embodiments, the phase adjustment module includes a phase detector to receive a first phase feedback signal of the first converter and a second phase feedback signal of the second converter, to measure the phase difference between the first phase feedback signal and the second phase feedback signal and to produce a phase detection output indicating the measurement. The phase adjustment module includes a phase combiner to combine the phase detection output and the phase compensation, and a phase controller coupled to the combiner to receive the combined phase detection output and phase compensation and to generate the phase control output in response.

In some embodiments, the phase compensator further limits the phase compensation to at least a minimum value of 1.

In some embodiments, the phase adjustment module includes a phase detector configured to receive a first phase feedback signal of the first converter and a second phase feedback signal of the second converter, to measure the phase difference between the first phase feedback signal and the second phase feedback signal and to produce a phase detection output indicating the measurement, a phase controller coupled to the phase detector and configured to receive the phase detection output and to generate a phase adjustment output in response, and a phase combiner configured to combine the phase adjustment output and the phase compensation and produce the phase control output.

In some embodiments, the cycle controller is further to adjust a time of the first drive signal using the phase control output. In some embodiments, the cycle duration is determined using the drive signal from the cycle controller to the corresponding gate. In some embodiments, the cycle duration is determined by reading a control parameter from a memory of the cycle controller. In some embodiments, the power phase duration ends when an inductor current of the first converter goes to zero. In some embodiments, the power phase duration ends when an inductor auxiliary winding voltage of the first converter goes to zero.

In some embodiments, the power phase duration ends when a voltage of a drain coupled to the first gate goes to the input voltage. In some embodiments, the phase compensator further limits the phase compensation to exceed a predetermined minimum value. In some embodiments, the interleaved boost converter operates in a discontinuous conduction mode. In some embodiments, the phase compensator generates a constant phase compensation when the first and the second converter operate in a boundary conduction mode.

In some embodiments, the phase compensator further receives a second cycle signal from the second converter, compares a second power phase duration to a second cycle duration of the second cycle signal, and generates a phase compensation based on the first and the second comparison.

Some embodiments further include a differential ON time generation circuit configured to generate a first ON time for the first converter and a second ON time for the second converter using an ON time input, the first and the second ON time determining a duration during which the first and the second converters are switched on, and wherein the cycle controller is configured to receive the first ON time and the second ON time and to generate the first drive signal and the second drive signal using the first ON signal and the second ON signal, respectively.

In some embodiments, the differential ON time generation circuit is coupled to the phase combiner to receive the phase control output and to generate the first and the second ON time in response thereto to adjust the phase between the first and the second phase feedback signals toward 180 degrees.

In an embodiment, an interleaved boost converter includes a first converter having a first gate and operating at a first phase configured to receive an input power and generate a first converted output power. A second converter has a second gate and operates at a second phase configured to receive an input power and generate a second converted output power. A phase compensator is configured to receive a cycle signal from at least one of the first converter and the second converter, the cycle signal having a power phase during which power is drawn from a respective converter input, the power phase having a primary stroke during which the first gate is enabled and a secondary stroke during which the first gate is disabled, the phase comparator to compare a duration of the power phase to a cycle duration from the start of the primary stroke to a start of a next primary stroke and to generate a phase compensation in response thereto. A phase adjustment module is configured to receive a first phase feedback signal of the first converter and a second phase feedback signal of the second converter, to measure the phase difference, to receive the phase compensation and to generate a phase control output in response to the phase difference and the phase compensation. A cycle controller is configured to receive the phase control output and to generate a first drive signal to control switching of the first gate and a second drive signal to control switching of the second gate, wherein times of the first and second drive signals are adjusted using the phase control output.

In an embodiment, a method includes receiving an input power at a first converter and at a second converter, generating an output power as an interleaved output of the first converter and the second converter, receiving a cycle signal from the first converter, the cycle signal having a power phase during which power is drawn from the input power, the power phase having a primary stroke during which a first gate of the first converter is enabled and a secondary stroke during which the first gate is disabled, comparing a duration of the power phase to a cycle duration of the first converter from the start of the primary stroke to a start of a next primary stroke and generating a phase compensation in response thereto, receiving a first phase feedback signal of the first converter and a second phase feedback signal of the second converter, measuring the phase difference, generating a phase control output in response to the phase difference and the phase compensation, and generating a first drive signal to control switching of the first gate of the first converter, and generating a second drive signal to control switching of a second gate of the second converter and adjusting a time of the second drive signal using the phase control output.

In some embodiments, the cycle duration is determined using the first drive signal. Some embodiments further include limiting the phase compensation to exceed a predetermined minimum value.

DETAILED DESCRIPTION

Figure 1:
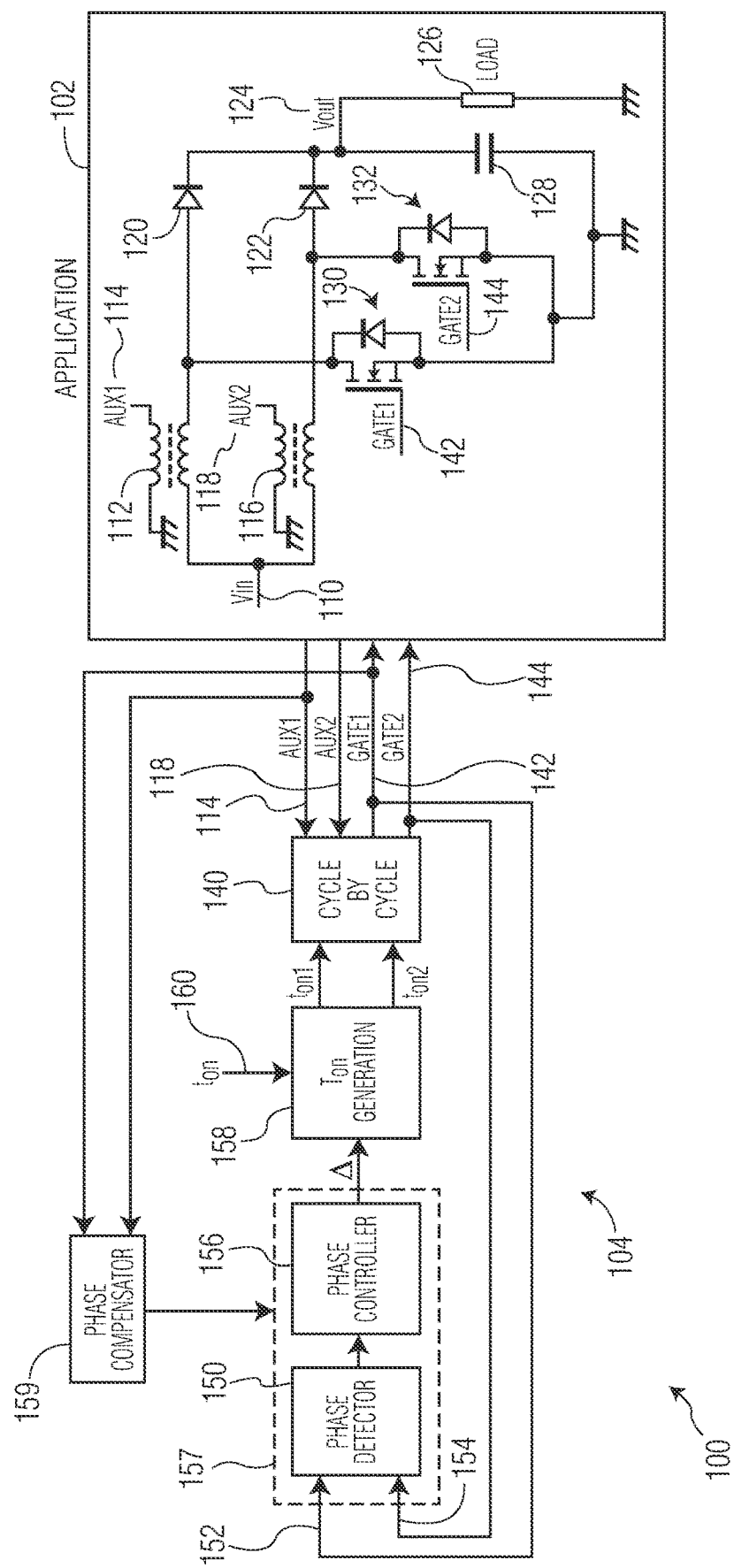
FIG. 1 is a diagram of a DC-DC interleaved boost converter.

It will be readily understood that the components of the embodiments as generally described herein and illustrated in the appended FIGS. could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

An interleaved PFC boost converter has two discrete converters that can be controlled independently. The two converters are switched on and off independently so that the on time of each converter is regulated separately. By controlling the on times, the phase between the two converters can be maintained close to 180 degrees so that the power output is interleaved. As described herein, the on time has two dimensions. The first is the duration that a converter is drawing power from the input. In a simple single MOSFET (Metal Oxide Semiconductor Field Effect Transistor) switch converter circuit, this on time is the time during which the switch or MOSFET gate is on. The second dimension is the time at which the gate is switched on. This is directly related to the phase or period of the converter switch.

FIG. 1 is a diagram of a DC-DC (Direct Current to Direct Current) interleaved boost converter 100 with an application 102 and a control system 104. The application 102 receives a DC input voltage 110 which is divided into two interleaved converters. The first converter receives the DC input voltage 110 at a first inductor 112 in series with a first diode 120 coupled to the converter output 124. A drain of a switch 130 in the form of a MOSFET (Metal Oxide Semiconductor Field Effect Transistor) is coupled between the first inductor 112 and the first diode 120. While a MOSFET is shown, other transistor types, such as bipolar transistors and other materials may be used such as GaN or SiC, among others, to suit different loads and input voltages. The source of the switch is coupled to ground. The second converter receives the DC input voltage 110 at a second inductor 116 in series with the DC input voltage 110 on one side of the inductor and in series with a second diode 122 on the other side of the inductor. The output nodes of the two diodes are coupled together at the converter output 124 opposite the inductors 112, 116. A drain of a second switch 132 in the form of a second MOSFET is coupled between the second inductor 116 and the second diode 122. The source of the first switch 130 and of the second switch 132 are both coupled to ground. The second converter has the same converter output 124 coupled to the outputs of the two diodes 120, 122. The output has a filter 128 in the form of parallel capacitor but a more complex filter may be used to suit different loads and input voltages. A load 126 is coupled to the converter output 124 and shown here as within the application. The load may be any type of energy storage or energy consumption device.

While the gate of a converter is ON, a power phase starts with a primary stroke as power is drawn from the input and stored in the inductor. Then during a secondary stroke of the power phase power is drawn from the input and delivered to the output. Also, the energy stored in the inductor is delivered to the output. When the current becomes zero, a ringing phase starts.

The two converters are controlled by the boost converter control system 104 that includes a phase detector 150, a phase controller 156, a differential ON time generation circuit 158, a cycle-by-cycle controller 140, and a phase compensator 159, among other components (not shown). The phase detector 150 and the phase controller 156 form a phase adjustment module 157 that is coupled to the phase compensator 159 to receive a phase compensation based on a cycle signal from one or both of the converters as described in more detail below.

The two switches 130, 132 are controlled by a cycle-by-cycle controller 140 that generates respective first and second drive signals 142, 144. The cycle-by-cycle controller 140, also referred to as the cycle controller, adjusts the first and second drive signals 142, 144 such that phase can be adjusted and the total power is regulated. The current through the respective two diodes 120, 122 therefore is interleaved and shifted in time.

A 180 degree phase difference means that the second converter turns on at a time that is exactly half-way between two consecutive turn on times of the first converter. Under some circumstances, the power from the two converters to the output alternates. At low input voltages each converter may be turned on for more than half of its cycle. As a result, the power phases of the converters overlap. At high input voltage the diode conducting time may be more than half of the converter's cycle. In this case both diodes are conducting at the same time, although one of the diodes may be at a higher current because of the phase difference of the converters.

A differential ON time generation circuit 158 receives an ON time input 160 from an external controller (not shown) and a phase control output from the phase adjustment module 157. This information is used to generate a respective first ON time and a second ON time that is provided to the cycle-by-cycle controller to control the duration during which the first and the second converters are switched ON. The differential ON time generation circuit receives the phase control output and generates the first and the second ON time in response to adjust the phase between the first and the second phase feedback signals toward 180 degrees. In some embodiments the ON time input 160 is a current or a voltage. The current or voltage may be increased for a longer ON time or reduced for a shorter ON time. The ON time may be a numerical value that represents a number of milliseconds or microseconds. In some embodiments, the phase difference is a numerical value which represents the difference in phase between the first and the second converter in milliseconds or microseconds or degrees.

The differential ON time generation circuit may generate the first ON time using the phase control output because increasing the ON time of one converter compared to the other converter will change the relative phase between the converters. In some embodiments $$t_{ON}1 = t_{ON}(1+\Delta)$$

$$t_{ON}2 = t_{ON}(1-\Delta)$$

where $t_{ON}1$ is the first ON time, $t_{ON}2$ is the second ON time, $t_{ON}$ is the ON time input, and $\Delta$ is the phase difference from the phase controller.

The phase controller 156 of the phase adjustment module 157 receives a phase signal from a phase detector 150 of the phase adjustment module 157 and generates a phase adjustment output in response to the phase signal indicating a measured phase measurement. In some embodiments, the phase controller is a proportional controller. The phase detector receives a phase feedback signal 152 which is connected to the first drive signal 142 coupled to the gate from the first converter and a phase feedback signal 154 which is connected to the second drive signal 144 coupled to the gate from the second converter. The phase feedback or gate signals are compared to measure the phase difference between the two phase feedback signals at the phase detector 150 and the resulting phase signal is a phase detection output indicating the measurement that is provided to the phase controller 156. In some embodiments when the phase difference is 180 degrees, the phase signal is 0.

The voltages on the auxiliary windings of the first inductor 112 and the second inductor 116 may be taken as feedback signals that are labeled as AUX 1 114 and AUX 2 118. The AUX 1 and AUX 2 signals are provided to the cycle-by-cycle controller to determine a start time for the first and second drive signals 142, 144. Alternatively, the drain voltage of the first switch 130 and the second switch 132 or the current through the first and second inductors 112, 116 may be used to define a start time for the first and second drive signals. Any other suitable signal may be measured that indicates the power output of the respective converter with respect to time. The AUX/Drain/Current signals are used by the cycle-by-cycle controller to determine when to turn on the first switch and the second switch using drive signals as described in more detail below.

While the phase control loop including the phase detector 150 and phase controller 156 regulate the phase difference between the two converter gates in some operational modes, the phase loop gain drops. A phase compensator 159 is added to compensate for this loss. The phase compensator 159 receives feedback from one or both of the converters, in this case the first inductor auxiliary winding voltage 114 and the first drive signal 142. Using this information, the phase compensator generates a phase compensation that is applied to the phase adjustment module 157. The phase compensation is applied to the phase signal or the phase adjustment output by the phase adjustment module to generate a phase control output.

Figure 2:
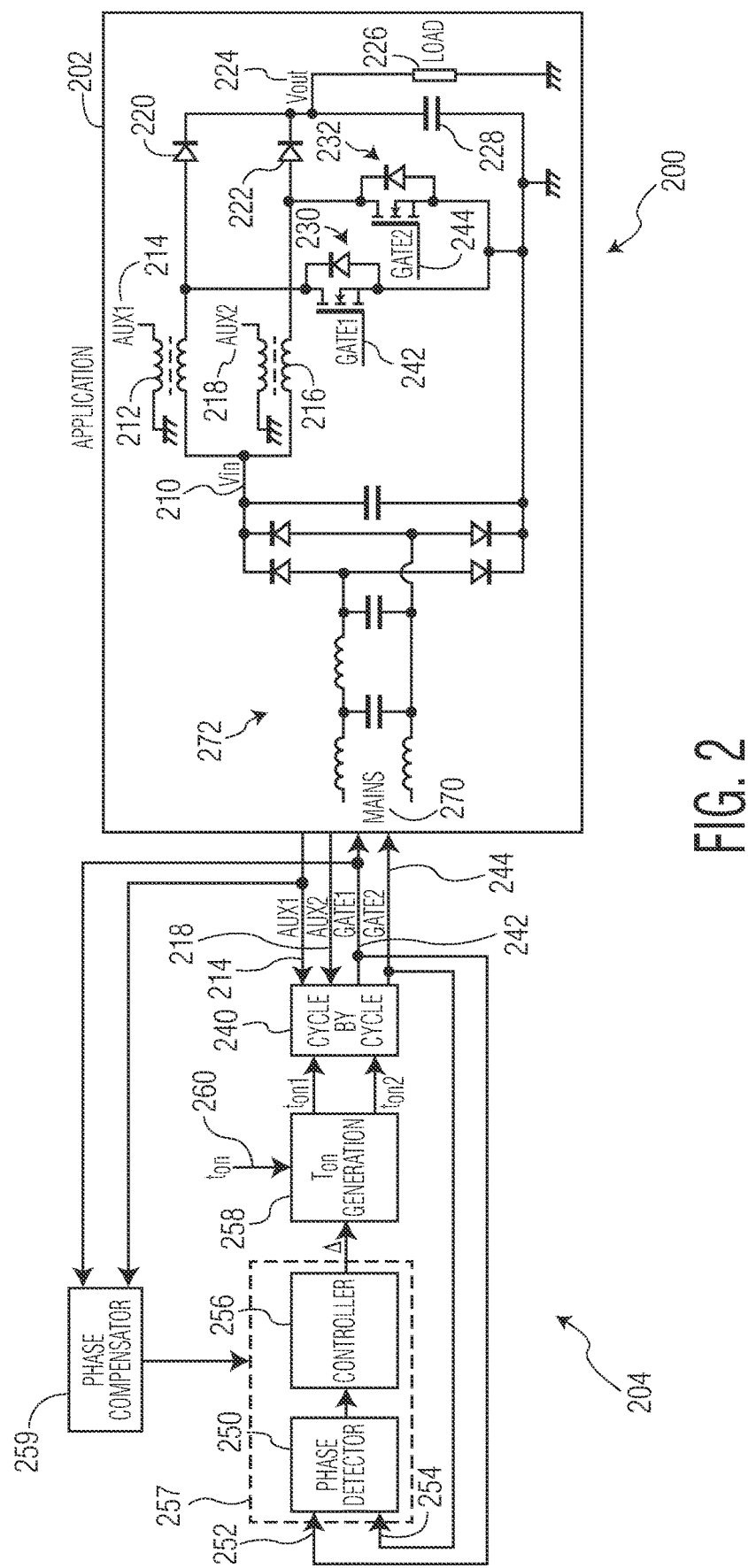
FIG. 2 is a diagram of an AC-DC interleaved boost converter.

FIG. 2 is a diagram of an AC-DC (Alternating Current to Direct Current) interleaved boost converter 200 with an application 202 and a control system 204. The application has a diode bridge rectifier 272 that receives an AC input 270, for example a mains voltage and generates a DC output. The mains voltage typically alternates at 50 or 60 Hz or some other value in the range of tens of Hertz. This output is the rectified input voltage 210 to the interleaved boost converter section. The boost converters are the same as in FIG. 1 and use two MOSFET transistor switches 230, 232 to interleave the power 210 from the rectifier 272 to the output 224 at a common node to power the load 226. The first converter receives the rectified input voltage 210 at a first inductor 212 that is coupled to the drain of the first switch 230 and to a first series output diode 220. The second converter receives the rectified input voltage 210 at a second inductor 216 that is coupled to the drain of the second switch 232 and to a second series output diode 222. The sources of the two transistor switches 230, 232 are coupled to ground. A load 226 is coupled to the output 224 and shown here as within the application. The output is filtered by a parallel grounded capacitor 228.

Phase feedback signals are measured from the first drive signal 242 and the second drive signal 244 from the cycle-by-cycle controller and applied as phase feedback signals 252, 254 to a phase detector 250. As mentioned above, the phase may be measured at any of a variety of different points on each converter. The phase detector 250 measures the phase difference between the two converters using the phase feedback signals 252, 254. In some embodiments, the phase feedback signals are combined to produce a phase difference voltage to a phase controller 256. If the two converters are completely out of phase, then the output will be zero. In some embodiments, the phase feedback signals are used to produce an output that is a numerical representation of the phase difference. The phase controller uses the phase detector output and generates a phase adjustment output. This may be performed using an analog amplifier or in the digital domain. The phase adjustment output, Δ, depending on operational conditions, may be modified by a phase adjustment from a phase compensator 259. The modification may be before or after the phase controller 256 or at another system node. The modified phase adjustment output is a phase control output that is applied to a differential ON time generation circuit 258 that combines the phase difference with an external torr value to generate time duration output signals, $t_{ON}1$, $t_{ON}2$, to drive a cycle-by-cycle controller 240, also referred to as a cycle controller, and adjust the phase between the first and the second phase feedback signals toward 180 degrees.

As in the example of FIG. 1, the cycle-by-cycle controller 240 controls the two transistor switches 230, 232 with respective first drive signal 242 and the second drive signal 244 applied to the gates of the switches. The cycle-by-cycle controller 240 adjusts the first drive signal 242 and the second drive signal 244 using the time duration output signals and the input AUX 1 214 and AUX 2 216 signals that, in this example, are measured at the auxiliary windings of the first inductor 212 and the second inductor 216, respectively to interleave the power phase of the two converters onto the output 224. The control loops and the interleaved converter sections of the configurations of FIG. 1 and FIG. 2 are shown as identical, but either or both may be modified to suit different applications.

While the phase control loop including the phase detector 250 and phase controller 256 regulate the phase difference between the two converter gates in some operational modes, the phase loop gain drops. A phase compensator 259 is added to compensate for this loss. The phase compensator 259 receives feedback from one or both of the converters, in this case the first inductor auxiliary winding voltage AUX1 214 and the first drive signal 242. Using this information, the phase compensator generates a phase compensation that is applied to the phase adjustment module. The phase adjustment module applies the phase compensation to generate a phase control output that is applied to the differential ON time generation circuit 260.

Figure 3:
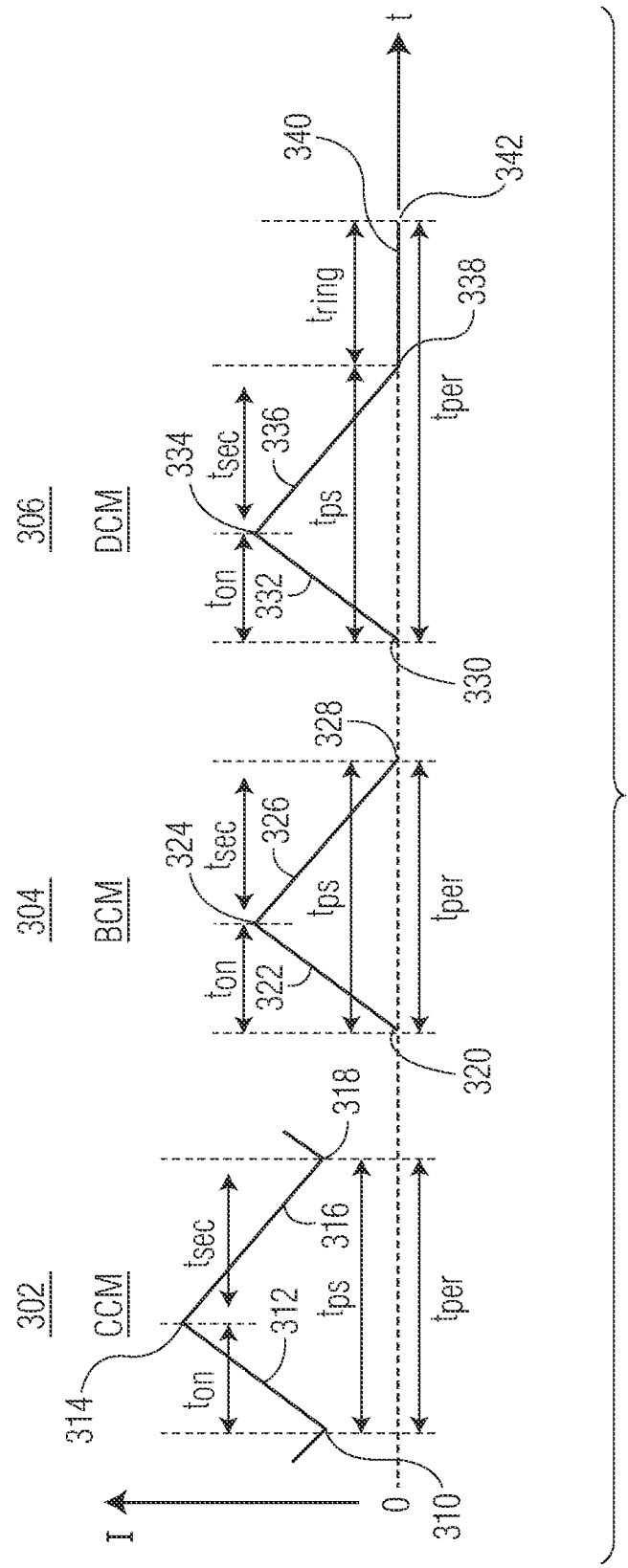
FIG. 3 is a graph of three different operational modes of an interleaved boost converter.

FIG. 3 is a graph of three different operational modes of an interleaved converter, for example the ones of FIG. 1 and FIG. 2 and variations thereof. The graph shows inductor current of one of the converters on the vertical axis against time on the horizontal axis. The solid-state switches of an interleaved PFC boost converter allow the converter to be operated in different modes. For medium and high-power applications, a CCM (Continuous Conduction Mode) is common. The CCM has a continuous input current which results in low conducted electromagnetic interference (EMI).

The first mode 302 represents CCM in which the inductor current never reaches zero and so the converter is conducting continuously. At the start of a power phase 310, the inductor current has reached its lowest point and the cycle-by-cycle controller turns the gate of the converter switch to ON. The inductor current increases through a primary stroke 312 reaching a peak at a point 314 corresponding to the transition to a secondary stroke. The duration of the primary stroke is the gate ON time indicated as torr. After the gate is switched off the current declines through the secondary stroke 316 until the end of the period of the power cycle as defined by the primary stroke and the secondary stroke. The end of the second stroke 318 corresponds to the beginning of the next period and the start of the next primary stroke. The period of operation corresponds to frequency on the order of KHz as compared to the tens of Hertz of an input AC voltage.

If the entire period is viewed as 360 degrees by analogy to sine waves, 180 degrees is exactly the middle. If the two converters are interleaved so that the primary stroke of the second converter starts at the midpoint of the period of the second converter and the point 314 is exactly in the middle, then the input current of the interleaved converter will be approximately a constant current. As the first converter inductor current is decreasing, the second converter inductor current is increasing. The position of the peak at the point 314 is dependent on input voltage and output voltage of the converter at low mains voltages, the peak is closer to the end and at high mains voltages, the peak is closer to the beginning. The output voltage is controlled to a value, the ripple voltage, caused by switching, for example may be further reduced with additional filtering as appropriate.

The second mode 304 is commonly referred to as BCM (Boundary Conduction Mode) or sometimes as CrCM (Critical Conduction Mode). In this mode, the primary and secondary stroke are very similar except that the gate of the converter switch is only turned ON when the inductor current reaches zero. The initial zero crossing 320 is the beginning of the primary stroke 322 of the ON time in the BCM mode 304. At the peak current time 324 the transition is made and the switch is set to OFF. The inductor current decreases during the secondary stroke 326 until a zero crossing 328. The period in BCM mode may be increased by increasing the ON time and thereby increasing the primary stroke. The secondary stroke will accordingly become longer as well. Increasing the period also increases the inductor current as the current becomes higher during the primary stroke. The described control loop of FIG. 1 may be used to change the ON time of a primary or master converter to increase or decrease the inductor current and the period. The secondary or slave converter may be matched to that period time or ON duration by adjusting the ON time of both converters, e.g., increasing the torr of one converter while decreasing the torr of the other converter. The timing may be adjusted through the phase detector and phase controller until the entire period is aligned to be out of phase with the first converter. In some embodiments, the phase between the two interleaved converters is aligned by adjusting only the duration of the switch ON time of both converters. This does not necessarily require adjustments to a ringing phase of the converters.

The third mode 306 is commonly referred to as DCM (Discontinuous Conduction Mode) because the inductor current (=input current) has a dead period where no power is delivered. There is an added delay after the secondary stroke before the next primary stroke. In the DCM mode 306, the first stroke begins at a zero inductor current crossing time 330 with the switch turned ON. The primary stroke 332 extends through a current rise time and a peak inductor current 334 at which the switch ON time is ended and the inductor current falls during the second stroke 336 to a zero inductor current crossing 338. Instead of starting the next period at the end of this power phase, the switch remains off for an additional time 340 during a ringing phase. The end of the ringing phase is the end of the period 342 at which time the next power phase begins with another primary stroke 332 by turning the switch to ON with a drive signal from the cycle-by-cycle converter.

The power phase may be considered as the time during which power is drawn from the input node. The ringing phase is a time during which the inductor current is ringing around zero current due to the inductor value and the and capacitance of the physical circuit. The drain voltage of the MOSFET switch rings around the input voltage in this phase. If the amplitude of the drain voltage ringing is below the threshold of the output diode, then no power will reach the output node during the ringing phase.

Many interleaved power factor correction (PFC) converter control systems currently support only BCM to make the phase equal to 180 degrees. With an interleaved PFC converter operating in DCM with valley switching, the 180 degree phase difference can be lost when a converter jumps to a different number of valleys. In this case, the bandwidth of the phase control loop should may be high enough to quickly regulate the phase difference back to 180 degrees. The phase compensator is able to regulate the phase difference back to 180 degrees quickly.

For the converters and the cycle-by-cycle controller, a small signal transfer function gain can be characterized as a proportionality as follows:

$$K_{converter} \propto \frac{t_{ps}}{t_{on} \cdot t_{per\_act}^2} \qquad (1)$$

in which $K_{converter}$ is the gain of the converter, $t_{ps}$ is the duration of the power stroke as shown in FIG. 3, ton is the duration of the gate on time, $t_{per\_act}$ is the real actual duration of a cycle or period of the converter, indicated as $t_{per}$ in FIG. 3. The actual duration of a period of the converter may be different from the wanted period in BCM operation or in DCM operation when valley switching is used.

For the control system, the proportional part is important for the loop bandwidth and stability. When the loop phase gain is 0 dB and the system is stable, then at this frequency the controller behavior may be represented with a simpler proportion as follows:

$$K_{controller} \propto P \qquad (2)$$

in which P represents a constant gain.

For the $t_{ON}$ generation, that is for the differential ON time generation circuit, different circuits can be used. In some embodiments, a circuit is used that has a small signal transfer function to generate a $t_{ON}$ signal for each converter as $t_{ON1}$ and $t_{ON2}$ which are both related to $t_{ON}$ as: $t_{on1} = t_{on} \cdot (1+\Delta)$ and $t_{on2} = t_{on} \cdot (1-\Delta)$. This leads to a proportional phase gain as follows in which $Kt_{ON}$ is the phase gain of the differential ON time generation circuit:

$$K_{ton} \propto t_{on} \qquad (3)$$

Figure 4:
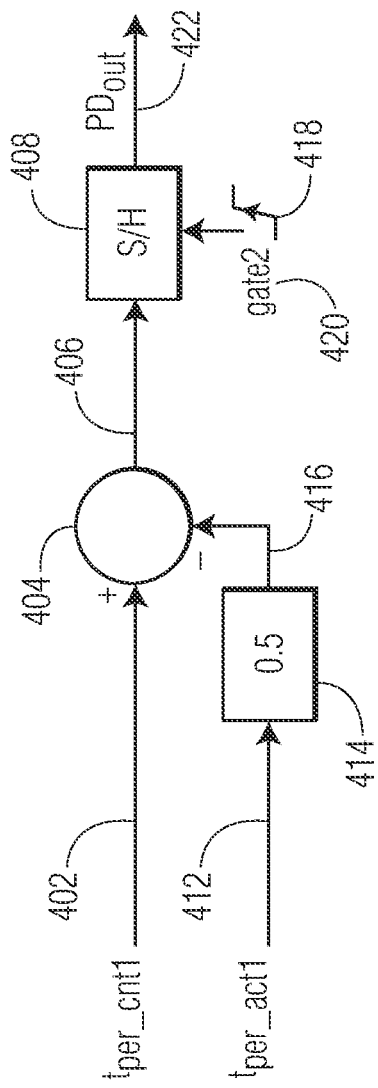
FIG. 4 is a diagram of a phase detector.

FIG. 4 is a block diagram of an example implementation of a phase detector. A first input $t_{per\_cnt1}$ 402 is applied as a first phase signal to a combiner 404. $t_{per\_cnt1}$ 402 is a parameter which is related to a count of time. It starts at 0, when the gate has a rising edge just as $t_{per\_act}$ 412. It may be determined in one example by a digital counter or in another example by an analog voltage across a capacitor. The capacitor is sourced with a constant current and then discharges during a converter cycle. To obtain an exact 180 degree phase difference for gate 1, gate2 is turned on when $t_{per\_cnt1} = \frac{1}{2} t_{per\_act}$. $t_{per\_act}$ is the peak value of $t_{per\_cnt}$ so that the turn on is exactly between two rising edges of gate1.

A second input signal $t_{per\_act1}$ 412 is applied to a divide by two circuit 414 and the divided signal 416 is also applied to the combiner 404. The combined signal 406 is applied to a sample and hold circuit 408. The sample and hold is controlled by a switch 418 to set the hold time. In this embodiment, the sampled signal is held until the rising edge 418 of the second gate of the second converter. The result is a sampled value the output of the phase detector $PD_{out}$ 422.

Figure 5:
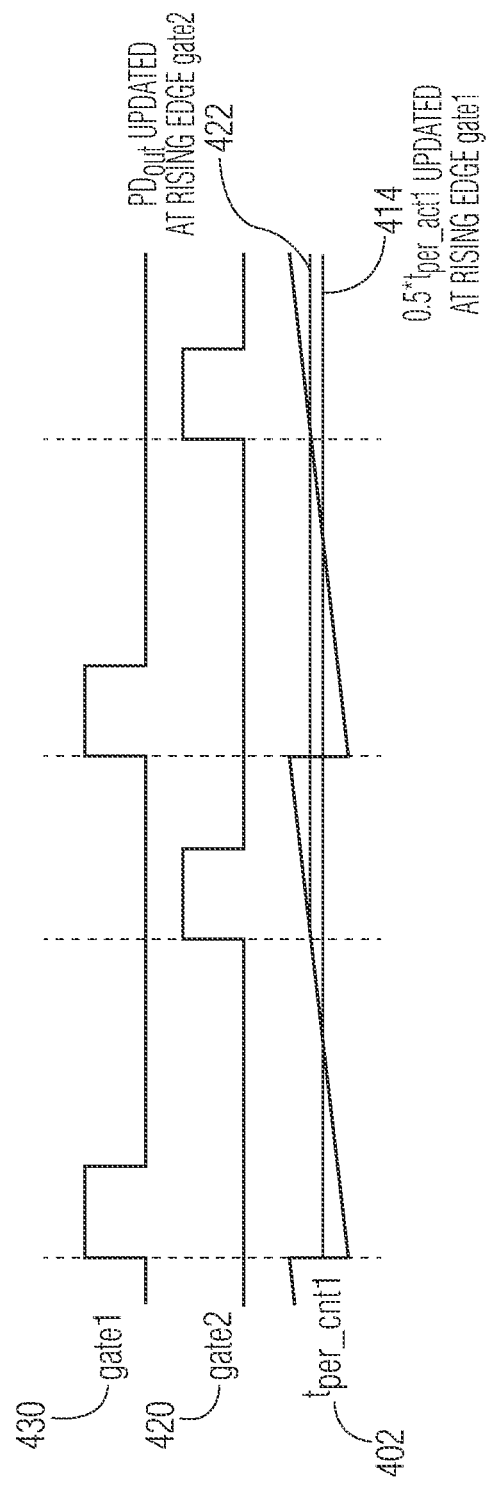
FIG. 5 is a graph of input and output of a phase detector versus time on the horizontal axis.

FIG. 5 is a graph representation of the inputs and output of the phase detector of FIG. 4. The first drive signal 430, indicated as gate1, that drives the first gate of the first converter is represented as a binary signal over time on the horizontal axis. The second drive signal 420, indicated as gate2, that drives the second gate of the second converter is represented as a binary signal on the same horizontal time axis. The bottom graph indicates how $t_{per\_cnt1}$ 402 is reset to zero at the rising edge of the first drive signal 430 and ramps up until the next rising edge of the first drive signal 430. The maximum value of 402 is the Tper_act1. The divided signal 416 like the second input signal $t_{peract1}$ 412 is updated at every rising edge of the first drive signal 430. The output of the phase detector $PD_{out}$ 422 is updated at the rising edge of the second drive signal 420 by the operation of the sample and hold circuit 408.

The operation of the phase detector to produce the signal shown in the graph of FIG. 5 illustrates that the gain is proportional to the second input signal $t_{peract1}$ 412 to the phase detector and may be indicated as:

$$K_{PD} \propto t_{per\_act} \quad (4)$$

in which $K_{PD}$ represents the phase gain of phase detector. Considering all of the components discussed above, the total gain of the phase loop may be represented by each component that contributes to the gain:

$$K_{loop\_var} \propto K_{converter} \cdot K_{controller} \cdot K_{ton} \cdot K_{PD} \quad (5)$$

when the boost converter is operated in BCM, the loop gain should be constant. Equation 5 may then be expressed as:

$$K_{loop\_var} \propto \frac{t_{ps}}{t_{on} \cdot t_{per\_act}^2} \cdot t_{on} \cdot t_{per_{act}} = \frac{t_{ps}}{t_{per\_act}} \quad (6)$$

where for BCM:

$$t_{ps} = t_{per\_act} \rightarrow K_{loop\_var} \propto 1 \quad (7)$$

and for DCM:

$$t_{per\_set} = t_{per\_act} \rightarrow K_{loop\_var} \propto \frac{t_{ps}}{t_{per\_set}} \quad (8)$$

Accordingly, the phase loop gain in DCM is always less than 1. This may be compensated by the inverse value of the loop gain. The gain compensation ($gain_{comp}$) may be indicated as:

$$gain_{comp} = \frac{t_{per\_act}}{t_{ps}} = \max\left(\frac{t_{per\_set}}{t_{ps}}, 1\right) \quad (9)$$

Considering equations 6, 7, and 8 both BCM and DCM may be implemented in one system with appropriate adjustments to the phase gain of the loop. Any of a variety of different phase detector and differential ON time generation circuits may be used to suit any particular implementation. In such embodiments, the BCM phase loop gain may be kept constant, which could result in additional compensations being suitable. Even with additional compensations, it is expected that Equation 9 will hold and be valid also for DCM.

Considering equation 9, the phase loop gain may be compensated for phase variations introduced through the phase loop when the boost converter is operated in DCM. The phase compensation value may be clamped on the high side and on the low side. In addition, the BCM, a constant phase compensation factor may be used. This constant may be supplied by a phase compensator that work also in DCM. Alternatively, the constant phase compensation may be provided by the phase detector or the differential ON time generation circuit.

Equation 9 provides two different ratios for the phase compensation in DCM. One uses the actual period of a converter cycle $t_{per\_act}$. This is determined by measuring some actual parameters of the converter. The other ratio uses the setting for the period of the converter cycle $t_{per\_set}$ which may differ from the actual value but is easily read from a memory and is close to the actual value. The denominator for both ratios is the same and is the period of the power phase of the converter during a cycle $t_{ps}$.

Figure 6:
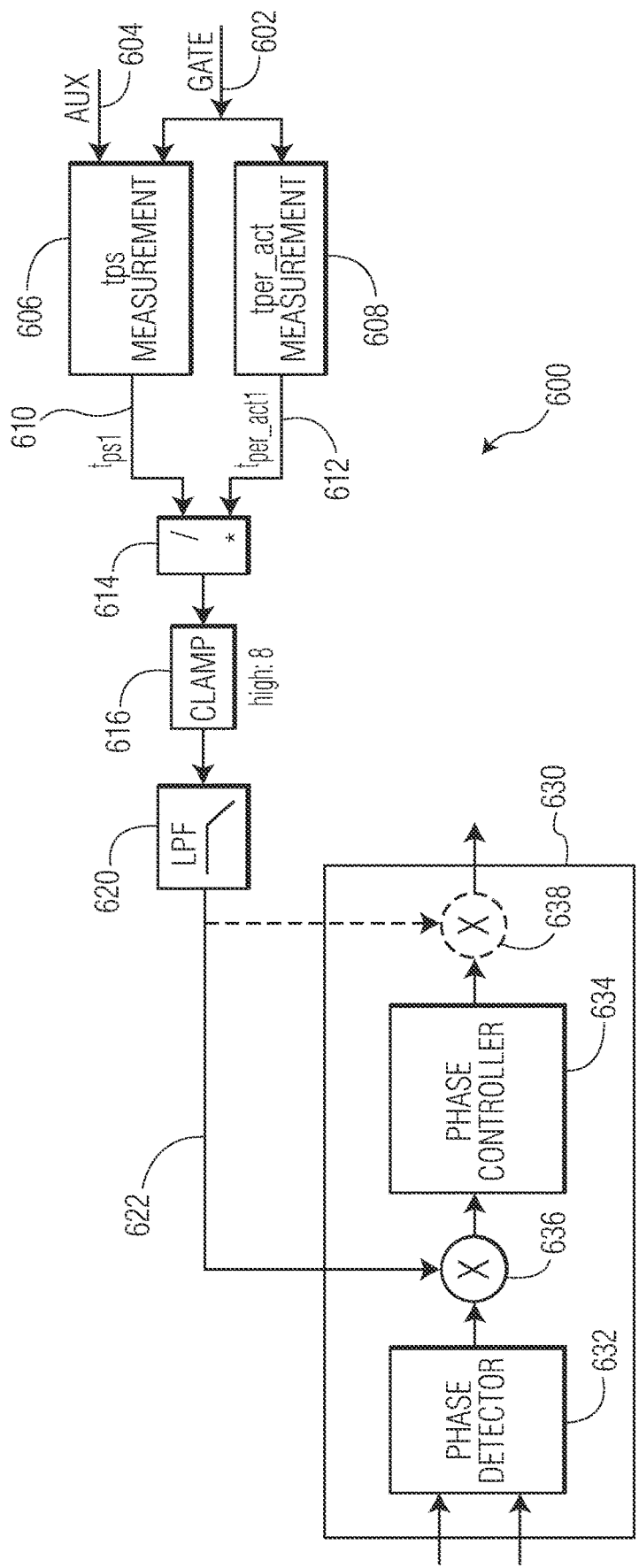
FIG. 6 is a diagram of a phase compensator using an actual cycle period.

FIG. 6 is a block diagram of a phase compensator 600 for the actual period of a converter with a connection to a phase adjustment module 630 that is similar to the phase adjustment modules 157, 257 of FIGS. 1 and 2. The phase compensator receives inputs from one or more of the converters of the boost converters or the cycle-by-cycle controller. In this example, a drive signal 602 and an auxiliary winding voltage signal AUX 604 for one of the converters are received as inputs. The inputs may be from either converter or from both converters for separate processing. the drive signal is applied to both a $t_{ps}$ measurement block 606 and a $t_{per\_act}$ measurement block 608. The AUX is applied to the $t_{ps}$ measurement block 606. These signals are analog periodic waveforms and are measured as described in more detail below to determine time durations for each value.

The output 610 of the $t_{ps}$ measurement block 606 is labeled as $t_{ps1}$ and represents a measured time duration for a particular cycle, e.g. cycle 1. The output 612 of the $t_{per\_act}$ measurement block 608 is labeled as $t_{per\_act1}$ and represents a measurement for the same cycle, e.g. cycle 1. These are received at a divider 614 to generate the ratio as defined in e.g. Equation 9. The result is optionally tested against a high value clamp 616 to restrict the maximum amount of phase compensation. While a maximum of 8 is indicated, any other maximum may be used to suit a particular implementation. The phase compensation is optionally filtered through a low-pass filter 620 and the resulting phase compensation 622 is applied to the phase adjustment module 630.

Within the phase adjustment module 630, the phase compensation may be applied before or after the phase controller 634. In some embodiments, a combiner 636 is provided between a phase detector 632 and a phase controller 634 of the phase adjustment module to combine the phase compensation 622 with the phase detection output that is provided to the phase controller. In some embodiments, a combiner 638 is provided after the phase controller to combine the phase compensation 622 with the phase adjustment output of the phase controller. In the example configuration of FIG. 1, the combiner output is a phase control signal that is applied to the differential ON time generation circuit.

Figure 7:
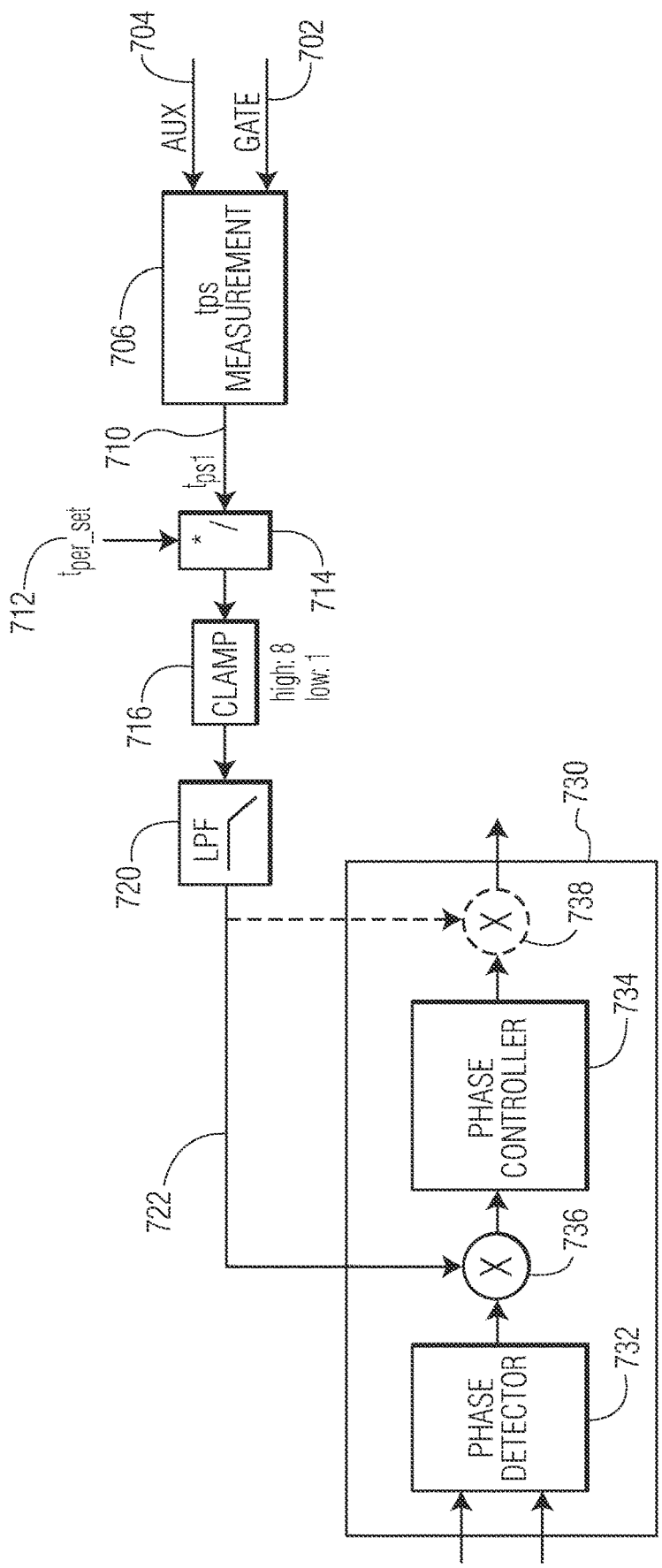
FIG. 7 is a diagram of a phase compensator using a set cycle period.

FIG. 7 is a block diagram of an alternative phase compensator 700 for the set period of a converter with a connection to a phase adjustment module 730 that is similar to the phase adjustment modules 157, 257 of FIGS. 1 and 2. The phase compensator receives inputs from one or more of the converters of the boost converters or the cycle-by-cycle controller. In this example, a drive signal 702 and an auxiliary winding voltage signal AUX 704 for one of the converters are received as inputs. The inputs may be from either converter or from both converters for separate processing. the drive signal and the AUX 704 are applied to a $t_{ps}$ measurement block 706. The analog periodic waveforms are measured determine an output 710 of the $t_{ps}$ measurement block 706, labeled as $t_{ps1}$.

This is sent to a divider to compare the output 710 to an input set power phase cycle duration 712 labeled as $t_{per\_set}$ to generate the ratio as defined in e.g. Equation 9. The set period value, $t_{per\_set}$, is a predetermined value that has been selected by the differential ON time generation circuit. It may be a numerical value, a voltage, or a current. This value will be stored in a memory or generated by a connected circuit for use by the control system. The cycle-by-cycle controller will drive the converters to obtain this value in the actual operation of the converters. In most cases the actual value will be the same or very close to the set value so very similar results are obtained using the set value. The result is optionally tested against a high and low value clamp 716 to restrict the maximum and minimum amount of phase compensation. While a maximum of 8 is indicated, any other maximum may be used to suit a particular implementation. The phase compensation is optionally filtered through a low-pass filter 720 and the resulting phase compensation 722 is applied to the phase adjustment module 730.

As shown in FIG. 3, $t_{ps}$ should always be the same or less than $t_{per}$ in each mode. The ratio in BCM should ideally be 1 and in DCM should ideally be more than one. For actual measurements of actual converters the value of the ratio should never be less than 1, however accounting for margins of error, rounding of values and possible system errors, a clamp 716 provides an extra margin of safety. When the set value is used, $t_{per\_set}$ then the ratio may go below 1 under some circumstances (e.g. BCM) and so the clamp is also helpful. A ratio below 1 may be undesirable and affect system stability. The clamp, in effect, renders the phase compensation to a constant value in BCM and CCM. The clamp may also be used at the high side to limit the signal in both actual and set period ratios, but is optional.

Within the phase adjustment module 730, the phase compensation may be applied before or after the phase controller 734. In some embodiments, a combiner 736 is provided between a phase detector 732 and a phase controller 734 of the phase adjustment module to combine the phase compensation 722 with the phase detection output that is provided to the phase controller. In some embodiments, a combiner 738 is provided after the phase controller to combine the phase compensation 722 with the phase adjustment output of the phase controller. In the example configuration of FIG. 1, the combiner output is a phase control signal that is applied to the differential ON time generation circuit.

Figure 8:
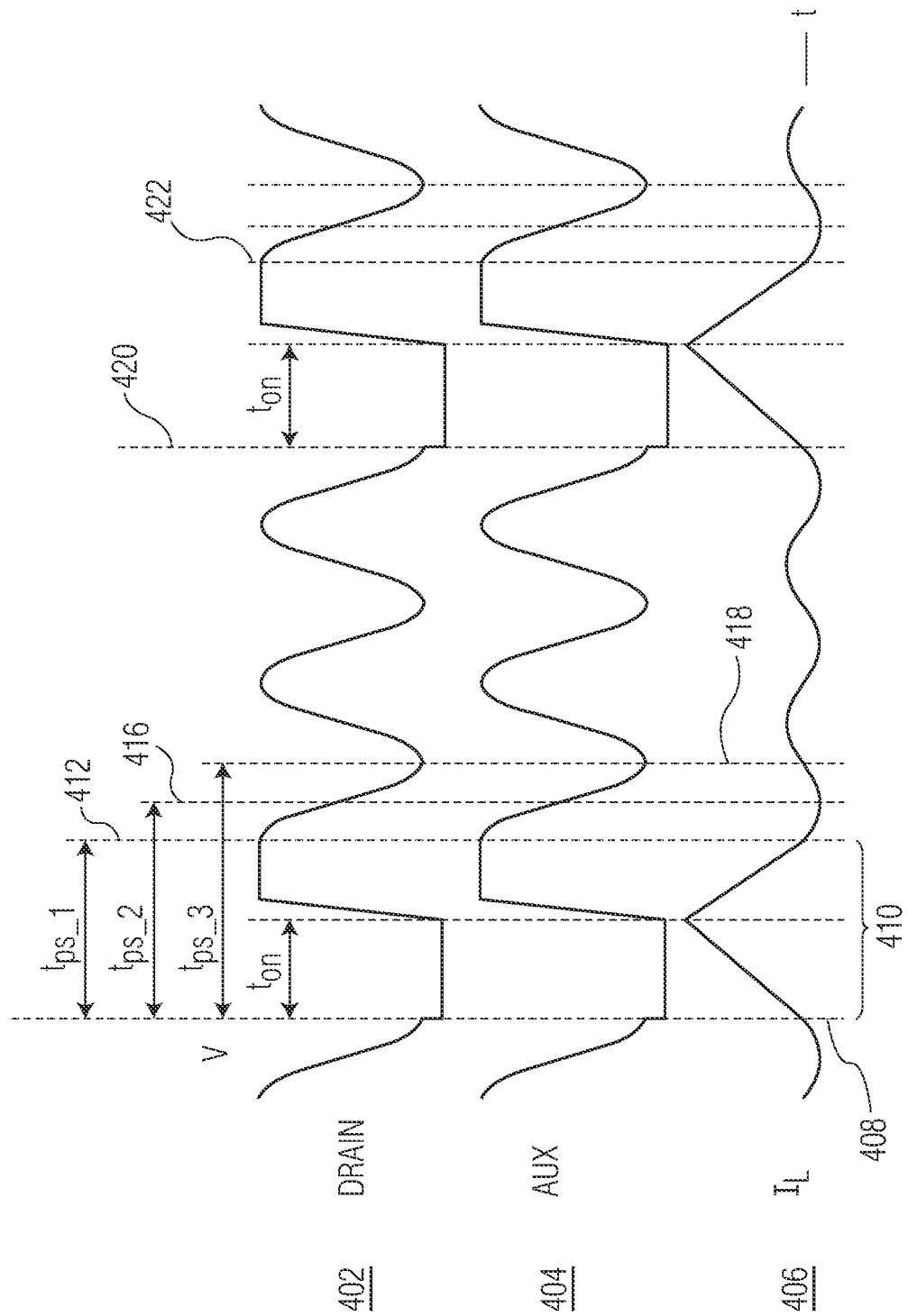
FIG. 8 is a graph of voltage and current measured during a power phase and a cycle time of an interleaved boost converter.

The $t_{ps}$ measurement blocks 606, 706 may operate in different ways. The measurement may be triggered by the current FIG. 8 is a graph of the voltage measured at two different locations and the measured inductor current to measure the $t_{ps}$ by the measurement blocks 606, 706. At 802, the drain voltage of a gate of a converter is graphed on the vertical axis against time on the horizontal axis. At time 808 a power phase 810 begins with the gate enabled or ON. This instant is used as the start time for the $t_{ps}$ measurement although other times may be used instead. The gate is enabled for a time determined as torr and then it is disabled. The drain voltage immediately rises. The end of the power phase and of the $t_{ps}$ period is also the start of the ringing phase in DCM. The end may be measured in different ways. One suitable event is when the drain voltage begins to fall as shown at time 812 and indicated as $t_{ps\_1}$. Another suitable event is when the drain voltage hits zero or the minimal ringing value (valley) as shown at time 818 and indicated as $t_{ps\_3}$.

At 804 the voltage of the auxiliary winding of the inductor of a converter is shown. This voltage is similar to that of the drain and the same suitable occurrences apply as with the drain voltage. The shape of the curve is the same as for the drain voltage only the average value of the drain voltage 802 is Vin and the average value of the AUX voltage 804 is 0. The zero crossing 816 of the AUX voltage, indicated as $t_{ps\_2}$, is a good end time for the power phase because a zero crossing is easy to detect.

At 806 the inductor current is shown on the vertical axis against time. At the time 812 when the power phase 810 ends, the inductor current has a zero crossing. It then starts ringing and has a second zero crossing at a second later time 818. This time corresponds to a first valley in the ringing voltage of the drain voltage 802 and the inductor auxiliary winding voltage 804. Any one or more of these events may be used to determine an end time for the power phase.

The end of the ringing phase 820 marks the beginning of the next power phase. The interval from the start or rising edge of the first power stroke at 808 and the rising edge of the next power stroke at 820 is one complete cycle of the converter and may be used as $t_{per\_actual}$ as described above in e.g. Equation 9 and the $t_{per\_actual}$ measurement block 608. The gate is enabled for the duration of the ON time. The primary stroke begins. At the end of the ON time, the gate is disabled and the inductor current reduces until the start 822 of the next ringing phase. In DCM mode, the duration of the ON time is regulated to control the output of the converter and the duration of the ringing phase.

For the comparison of $t_{ps}$ and $t_{per\_act}$ the cycle signal whether it is from a drain, or inductor is from the same converter. In some embodiments, different converters are controlled independently of other converters so that the timing of the cycles are different and cannot be compared directly. In addition, the phase compensation is also more accurate when the two values of $t_{ps}$ and $t_{per\_act}$ are measured from the same cycle since the timing may change from cycle to cycle. The phase compensation may be used in a variety of boost converters including interleaved boost converters that operate in BCM and in DCM with valley switching. The phase compensation is also useful for interleaved boost converters operating as power factor correction boost converters.

Figure 9:
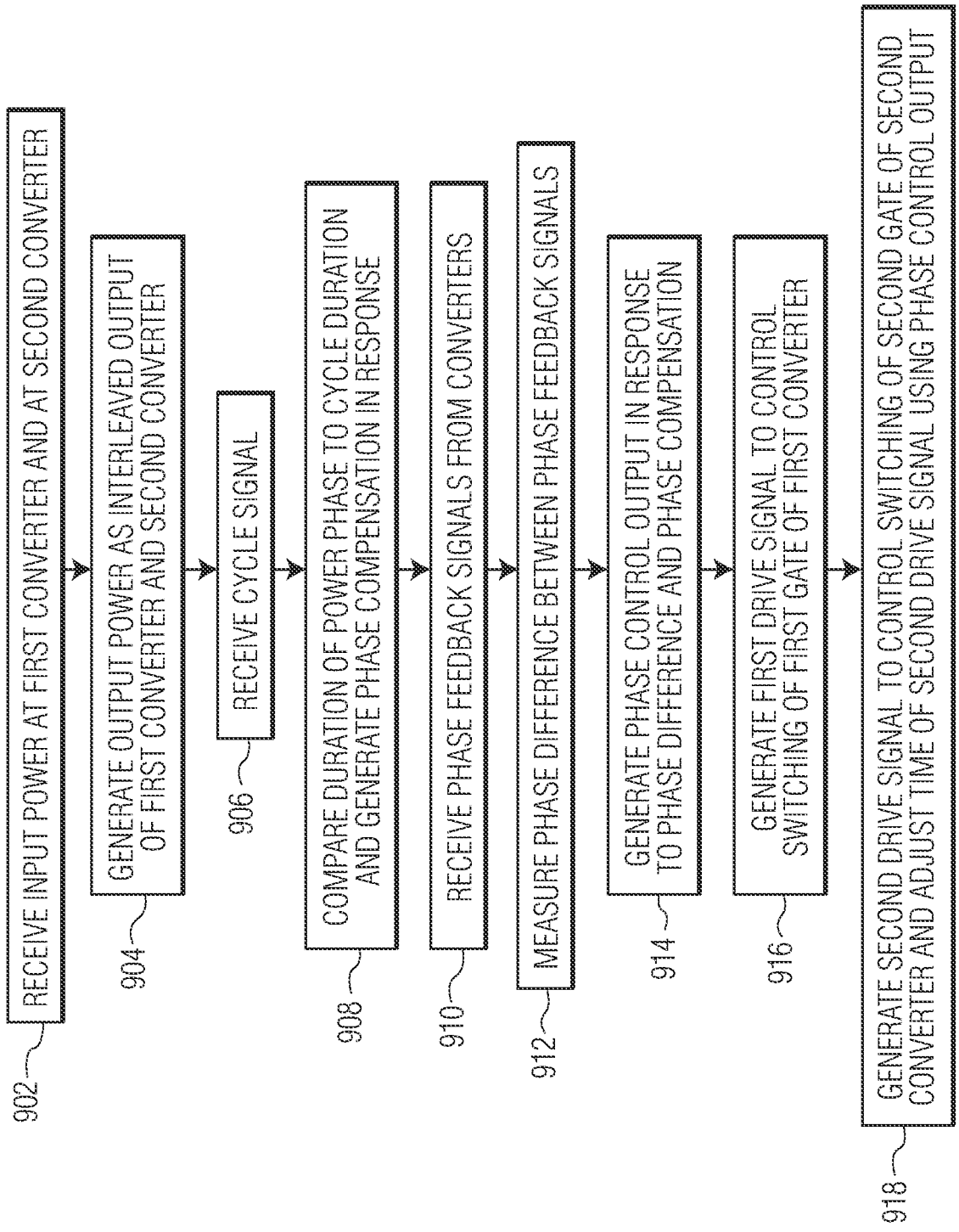
FIG. 9 is a process flow diagram of operating an interleaved boost converter.

FIG. 9 is a process flow diagram of a method of operation suitable for use with the interleaved boost converter of FIG. 1 and FIG. 2. At 902 an input power is received at a first converter and at a second converter and possibly additional converters of an interleaved boost converter, e.g. two inverters of an interleaved power factor correction (PFC) converter. At 904 the converters generate an output power as an interleaved output of the first converter and the second converter or more converters. This is an ongoing process of receiving input power and generating output power from the input power.

At 906 a cycle signal is received at a control system of the boost converter. The cycle signal is received from at least one of the first converter and the second converter and may be received from both. Each cycle signal has a power phase during which power is drawn from the power input. The power phase has a primary stroke during which the first gate is enabled and a secondary stroke during which the first gate is disabled. At 908 the duration of the power phase is compared to a cycle duration. The cycle duration is from the start of the primary stroke to a start of a next primary stroke. In some embodiments, the power phase duration and the cycle duration are from the same cycle of the same converter. A phase compensation is then generated in response to the comparison.

In some embodiments a phase compensator receives the cycle signal from one or more converters and then generates the phase compensation. The phase compensation may be to compensate for the phase gain of the phase control system loop. In some embodiments, instead of measuring the characteristics of the cycle signal to determine an actual cycle duration, a control parameter may be read from memory of a cycle controller. The control parameter may be a numerical value or an analog value such as voltage or current.

The phase compensation may be clamped on the high side or the low side, or both depending on the implementation. A clamp at the high side may be used to limit the phase compensation to some maximum value. This reduces the response to quick changes that may cause some overshoot. A lower limit of 1 increases the stability when using a set cycle duration. When the actual cycle duration is used, then the phase compensation should not be less than 1 unless there is some inaccuracy or error in the system so the clamp serves only as a precaution. The phase compensation should be at 1 or very close to one in BCM.

At 910 a first phase feedback signal is received from the first converter and a second phase feedback signal is received from the second converter. At 912, the phase difference between the signals is measured and at 914 a phase control output is generated in response to the phase difference and the phase compensation.

As described a phase adjustment module may be connected to the converters to receive the phase feedback signals and to the phase compensator to receive the phase compensation. The phase adjustment module has a phase detector to determine the phase difference and a phase controller to generate a phase adjustment output. The phase compensation may be applied before or after the phase controller. The phase adjustment output influences the first and second drive signal timing.

At 916, a first drive signal is generated to control the switching of a first gate of the first converter. At 918 a second drive signal is generated to control the switching of a second gate of a second converter, wherein a time of the second drive signal is adjusted using the phase control output. The drive signals may be generated in a cycle-by-cycle controller coupled to a phase adjustment module, however, other configurations may be used to suit particular applications.

Embodiments of the present invention provide a mechanism to control a phase between interleaved boost converters particularly suitable for operation in Discontinuous Conduction Mode but also suitable for other modes. This mechanism may be applied to boost converters for a wide range of different applications and power capabilities for DC-DC and AC-DC applications. The mechanism may use analog or digital controller componentry.

The connections as discussed herein may be any type of connection suitable to transfer signals or power from or to the respective nodes, units, or devices, including via intermediate devices. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals.

The described examples may be implemented on a single integrated circuit, for example in software in a digital signal processor (DSP) as part of a radio frequency integrated circuit (RFIC). Alternatively, the circuit and/or component examples may be implemented as any number of separate integrated circuits or separate devices interconnected with each other in a suitable manner. These examples may alternatively be implemented as soft or code representations of physical circuitry or of logical representations convertible into physical circuitry, such as in a hardware description language of any appropriate type.

Boundaries between the above-described operations are provided as examples. Multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A boost converter control system, comprising:
    a phase compensator to receive a cycle signal from a first converter of an interleaved boost converter, the cycle signal having a power phase during which power is drawn from an input of the first converter, the power phase having a primary stroke during which a first gate of the first converter is enabled and a secondary stroke during which the first gate is disabled, the phase compensator to compare a duration of the power phase to a cycle duration from the start of the primary stroke to a start of a next primary stroke and to generate a phase compensation in response thereto;
    a phase adjustment module to receive a first phase feedback signal of the first converter and a second phase feedback signal of a second converter of the interleaved boost converter, to measure the phase difference, to receive the phase compensation and to generate a phase control output in response to the phase difference and the phase compensation;
    a cycle controller to receive the phase control output and to generate a first drive signal to control switching of a first gate of the first converter and a second drive signal to control switching of a second gate of the second converter, wherein times of the first and second drive signals are adjusted using the phase control output.

2. The boost converter control system of claim 1, wherein the phase adjustment module comprises:
- a phase detector to receive a first phase feedback signal of the first converter and a second phase feedback signal of the second converter, to measure the phase difference between the first phase feedback signal and the second phase feedback signal and to produce a phase detection output indicating the measurement;
- a phase combiner to combine the phase detection output and the phase compensation;
- a phase controller coupled to the combiner to receive the combined phase detection output and phase compensation and to generate the phase control output in response.

3. The boost converter control system of claim 2, wherein the phase compensator further limits the phase compensation to at least a minimum value of 1.

4. The boost converter control system of claim 1, wherein the phase adjustment module comprises:
- a phase detector to receive a first phase feedback signal of the first converter and a second phase feedback signal of the second converter, to measure the phase difference between the first phase feedback signal and the second phase feedback signal and to produce a phase detection output indicating the measurement;
- a phase controller coupled to the phase detector to receive the phase detection output and to generate a phase adjustment output in response;
- a phase combiner to combine the phase adjustment output and the phase compensation and produce the phase control output.

5. The boost converter control system of claim 1, wherein the cycle controller is further to adjust a time of the first drive signal using the phase control output.

6. The boost converter control system of claim 1, wherein the cycle duration is determined using the drive signal from the cycle controller to the corresponding gate.

7. The boost converter control system of claim 1, wherein the cycle duration is determined by reading a control parameter from a memory of the cycle controller.

8. The boost converter control system of claim 1, wherein the power phase duration ends when an inductor current of the first converter goes to zero.

9. The boost converter control system of claim 1, wherein the power phase duration ends when an inductor auxiliary winding voltage of the first converter goes to zero.

10. The boost converter control system of claim 1, wherein the power phase duration ends when a voltage of a drain coupled to the first gate goes to the input voltage.

11. The boost converter control system of claim 1, wherein the phase compensator further limits the phase compensation to exceed a predetermined minimum value.

12. The boost converter control system of claim 1, wherein the interleaved boost converter operates in a discontinuous conduction mode.

13. The boost converter control system of claim 1, wherein the phase compensator generates a constant phase compensation when the first and the second converter operate in a boundary conduction mode.

14. The boost converter control system of claim 1, wherein the phase compensator further receives a second cycle signal from the second converter, compares a second power phase duration to a second cycle duration of the second cycle signal, and generates a phase compensation based on the first and the second comparison.

15. The boost converter control system of claim 1, further comprising:
- a differential ON time generation circuit to generate a first ON time for the first converter and a second ON time for the second converter using an ON time input, the first and the second ON time determining a duration during which the first and the second converters are switched on, and
- wherein the cycle controller is configured to receive the first ON time and the second ON time and to generate the first drive signal and the second drive signal using the first ON signal and the second ON signal, respectively.

16. The boost converter control system of claim 15, wherein the differential ON time generation circuit is coupled to the phase combiner to receive the phase control output and to generate the first and the second ON time in response thereto to adjust the phase between the first and the second phase feedback signals toward 180 degrees.

17. An interleaved boost converter, comprising:
- a first converter having a first gate and operating at a first phase to receive an input power and generate a first converted output power;
- a second converter having a second gate and operating at a second phase to receive an input power and generate a second converted output power;
- a phase compensator to receive a cycle signal from at least one of the first converter and the second converter, the cycle signal having a power phase during which power is drawn from a respective converter input, the power phase having a primary stroke during which the first gate is enabled and a secondary stroke during which the first gate is disabled, the phase comparator to compare a duration of the power phase to a cycle duration from the start of the primary stroke to a start of a next primary stroke and to generate a phase compensation in response thereto;
- a phase adjustment module to receive a first phase feedback signal of the first converter and a second phase feedback signal of the second converter, to measure the phase difference, to receive the phase compensation and to generate a phase control output in response to the phase difference and the phase compensation;
- a cycle controller to receive the phase control output and to generate a first drive signal to control switching of the first gate and a second drive signal to control switching of the second gate, wherein times of the first and second drive signals are adjusted using the phase control output.

18. A method comprising:
- receiving an input power at a first converter and at a second converter;
- generating an output power as an interleaved output of the first converter and the second converter;
- receiving a cycle signal from the first converter, the cycle signal having a power phase during which power is drawn from the input power, the power phase having a primary stroke during which a first gate of the first converter is enabled and a secondary stroke during which the first gate is disabled;
- comparing a duration of the power phase to a cycle duration of the first converter from the start of the primary stroke to a start of a next primary stroke and generating a phase compensation in response thereto;
- receiving a first phase feedback signal of the first converter and a second phase feedback signal of the second converter;
- measuring the phase difference;

generating a phase control output in response to the phase difference and the phase compensation; and generating a first drive signal to control switching of the first gate of the first converter;

generating a second drive signal to control switching of a second gate of the second converter and adjusting a time of the second drive signal using the phase control output.

19. The method of claim 18, wherein the cycle duration is determined using the first drive signal.

20. The method of claim 18, further comprising limiting the phase compensation to exceed a predetermined minimum value.

* * * * *